United States Patent
Ling et al.

(10) Patent No.: US 12,452,024 B2
(45) Date of Patent: Oct. 21, 2025

(54) METHOD AND APPARATUS FOR HARQ-ACK FEEDBACK IN MULTI-TRP TRANSMISSION

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 466 days.

(21) Appl. No.: 18/016,550

(22) PCT Filed: Jul. 15, 2020

(86) PCT No.: PCT/CN2020/102165
§ 371 (c)(1),
(2) Date: Jan. 17, 2023

(87) PCT Pub. No.: WO2022/011607
PCT Pub. Date: Jan. 20, 2022

(65) Prior Publication Data
US 2023/0299928 A1  Sep. 21, 2023

(51) Int. Cl.
*H04L 5/00* (2006.01)
*H04L 1/1812* (2023.01)
(52) U.S. Cl.
CPC .......... *H04L 5/0055* (2013.01); *H04L 1/1812* (2013.01)
(58) Field of Classification Search
CPC .................. H04L 5/0055; H04L 1/1812
See application file for complete search history.

(56) References Cited

U.S. PATENT DOCUMENTS

| | | |
|---|---|---|
| 2020/0154466 A1 | 5/2020 | John Wilson et al. |
| 2020/0221432 A1 | 7/2020 | Park et al. |
| 2023/0163886 A1* | 5/2023 | Matsumura ........... H04L 1/1896 370/329 |

FOREIGN PATENT DOCUMENTS

WO  2020122685 A1  6/2020

OTHER PUBLICATIONS

International Searching Authority, "Written Opinion of the International Searching Authority," PCT/CN2020/102165, Apr. 12, 2021, pp. 1-3.

(Continued)

*Primary Examiner* — Elton Williams
(74) *Attorney, Agent, or Firm* — Kunzler Bean & Adamson

(57) ABSTRACT

Embodiments of the present application are related to a method and apparatus for hybrid automatic repeat request-acknowledge (HARQ-ACK) feedback in multi-transmit-receive point (multi-TRP) transmission. An exemplary method of the present application includes: receiving configuration information on HARQ-ACK feedback for physical downlink shared channel (PDSCH), wherein the configuration information at least indicates a plurality of CORESETPoolIndex values and a separate feedback mode for HARQ-ACK feedback excluding that for semi-persistent scheduling (SPS) PDSCH reception associated with different CORESETPoolIndex values, each CORESETPoolIndex value being associated with at least one physical uplink control channel (PUCCH) resource; and transmitting a plurality of HARQ-ACK feedback for SPS PDSCH receptions associated with at least one CORESETPoolIndex value in a time interval using a separate feedback scheme or a joint feedback scheme.

20 Claims, 10 Drawing Sheets

(56) References Cited

OTHER PUBLICATIONS

ZTE, Enhancements on multi-TRP/Panel transmission, 3GPP TSG RAN WG1 Ad-Hoc Meeting 1901, R1-1900087, Jan. 21-25, 2019, pp. 1-16, Taipei.

* cited by examiner

METHOD AND APPARATUS FOR HARQ-ACK FEEDBACK IN MULTI-TRP TRANSMISSION

TECHNICAL FIELD

Embodiments of the present application generally relate to wireless communication technology, especially to a method and an apparatus for hybrid automatic repeat request-acknowledge (HARQ-ACK) feedback in multi-transmit-receive point (multi-TRP) transmission.

BACKGROUND

Multi-TRP/panel transmission has been introduced into new radio (NR) release 16 (Rel-16), and enhancements on multiple-input multiple-output (MIMO) for NR have been discussed, for example in RP-182067. According to RP-182067, one specific objective of the work item is to extend specification support in enhancements on multi-TRP/panel transmission including: improved reliability and robustness with both ideal and non-ideal backhaul, including: specifying downlink control signalling enhancement(s) for efficient support of non-coherent joint transmission; performing study and, if needed, specifying enhancements on uplink control signalling and/or reference signal(s) for non-coherent joint transmission; and multi-TRP techniques for ultra reliable low latency communications (URLLC) requirements are included in this work item.

In Rel-16 URLLC, multiple agreements on transmitting ACK/NACK for multiple TRPs have been achieved. For example, multiple semi-persistent scheduling (SPS) physical downlink shared channel (PDSCH) configurations can be configured and how to determine the physical uplink control channel (PUCCH) resource when multiple HARQ-ACK bits for only SPS PDSCH receptions is specified in Rel-16. However, these agreements do not consider the case of multi-downlink control information (multi-DCI) based multi-TRP being configured.

Thus, there is a need for further complementing and improving technical solutions for transmitting a HARQ-ACK feedback in multi-TRP transmission scenarios.

SUMMARY OF THE APPLICATION

One objective of the embodiments of the present application is to provide a technical solution for supporting HARQ-ACK feedback for PDSCH in a single time interval, e.g., a slot in multi-TRP transmission.

According to an embodiment of the present application, a method may include: receiving configuration information on HARQ-ACK feedback for PDSCH, wherein the configuration information at least indicates a plurality of CORESETPoolIndex values and a separate feedback mode for HARQ-ACK feedback excluding that for SPS PDSCH reception associated with different CORESETPoolIndex values, each CORESETPoolIndex value being associated with at least one PUCCH resource; and transmitting a plurality of HARQ-ACK feedback for SPS PDSCH reception associated with at least one CORESETPoolIndex value in a time interval using a separate feedback scheme or a joint feedback scheme. In the case of using the separate feedback scheme, for each CORESETPoolIndex value, all HARQ-ACK feedback for SPS PDSCH reception associated with the CORESETPoolIndex value is transmitted in a corresponding associated PUCCH resource. In the case of using the joint feedback scheme, all HARQ-ACK feedback for SPS PDSCH reception associated with all CORESETPoolIndex values is transmitted in a PUCCH resource associated with a single CORESETPoolIndex value of the plurality of CORESETPoolIndex values.

According to another embodiment of the present application, a method may include: transmitting configuration information on HARQ-ACK feedback for PDSCH, wherein the configuration information at least indicates a plurality of CORESETPoolIndex values and a separate feedback mode for HARQ-ACK feedback excluding that for SPS PDSCH reception associated with different CORESETPoolIndex values, each CORESETPoolIndex value being associated with at least one PUCCH resource; and receiving a plurality of HARQ-ACK feedback for SPS PDSCH reception associated with at least one CORESETPoolIndex value in a time interval using a separate feedback scheme or a joint feedback scheme. In the case of using the separate feedback scheme, for each CORESETPoolIndex value, all HARQ-ACK feedback for SPS PDSCH reception associated with the CORESETPoolIndex value is received in a corresponding associated PUCCH resource. In the case of using the joint feedback scheme, all HARQ-ACK feedback for SPS PDSCH reception associated with all CORESETPoolIndex values is received in a PUCCH resource associated with a single CORESETPoolIndex value of the plurality of CORESETPoolIndex values.

Some embodiments of the present application also provide an apparatus, include: at least one non-transitory computer-readable medium having computer executable instructions stored therein, at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for HARQ-ACK feedback in multi-TRP transmission, especially for HARQ-ACK feedback for SPS PDSCH in the case of multi-DCI based multi-TRP being configured. Accordingly, embodiments of the present application can increase the robustness and flexibility of multi-TRP communication in a communication network, and facilitate the deployment and implementation of the NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

In a wireless communication system, there may be at least one TRP. A TRP acts like a small base station, and can be identified by a CORESETPoolIndex value. Each TRP can be used to serve one or more user equipment (UE) under the control of a base station (BS). In different application scenarios, a TRP may be described using different terminologies. In fact, in some application scenarios, for example, in a scenario of Coordinated Multi-Point (CoMP), the TRP can even be a base station. Persons skilled in the art should understand that as the 3GPP and the communication technology develop, the terminologies recited in the specification may change, which should not affect the scope of the present application.

Multiple TRPs may communicate with each other using a backhaul. Such backhaul may be an ideal backhaul or a non-ideal backhaul. Latency of the ideal backhaul may be deemed as zero, and latency of the non-ideal backhaul may be tens of milliseconds and much larger, e.g. on the order of tens of milliseconds, than that of the ideal backhaul.

Figure 1:
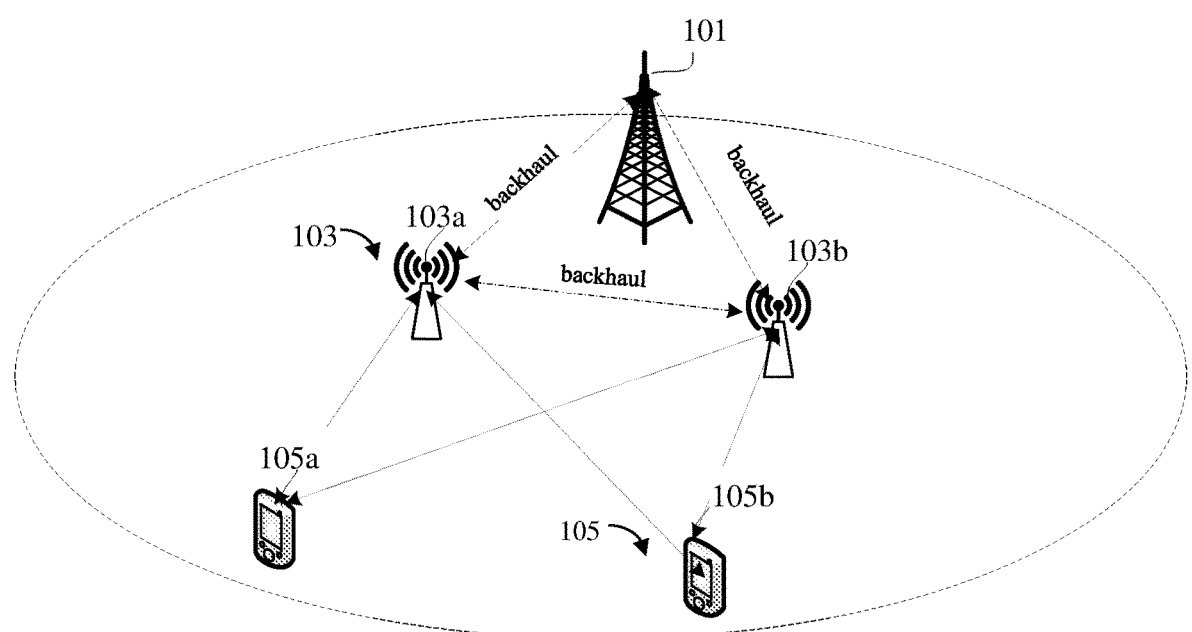
FIG. 1 is a schematic diagram illustrating an exemplary wireless communication system including at least one TRP according to an embodiment of the present application.

FIG. 1 is a schematic diagram illustrating an exemplary wireless communication system 100 including at least one TRP 103 according to an embodiment of the present application.

Specifically, as shown in FIG. 1, a wireless communication system 100 includes one base station 101, two TRPs 103, e.g., a first TRP 103a and a second TRP 103b, and two UEs 105, e.g., a first UE 105a and a second UE 105b. Although only one base station 101, two TRPs 103 and two UEs 105 are shown for simplicity, it should be noted that the wireless communication system 100 may further include more base stations 101, TRPs 103, and UEs 105. The base station 101 may be a gNB in some application scenarios. The TRPs 103, for example, the first TRP 103a and the second TRP 103b may be connected to the same or different base stations 101, for example using a backhaul. Each TRP 103 may also serve a number of UEs 105. As an example, both the first TRP 103a and the second TRP 103b may serve a number of mobile stations including the first UE 105a and the second UE 105b within a serving area, for example, a cell or a cell sector. The first TRP 103a and the second TRP 103b can also communicate with each other, for example via a backhaul. Either or both of the first UE 105a and the second UE 105b may represent a computing device, a wearable device, or a mobile device, etc.

In addition, HARQ-ACK feedback technology is commonly used during data transmission, to provide feedback on whether data was correctly received in the downlink (DL) or uplink (UL) transmission. HARQ-ACK represents collectively the positive acknowledgement (ACK) and the negative acknowledgement (NACK). ACK/NACK is important uplink control information (UCI) information in a multi-TRP transmission, wherein ACK means data was correctly received while NACK means data was erroneously received or missing.

Meanwhile, flexible physical uplink control channel (PUCCH) resource allocation has been introduced into the 5G wireless communication technology. A single PUCCH resource can carry HARQ-ACK feedback associated with a downlink transmission, for example a physical downlink shared channel (PDSCH) is specified in TS 38.213. Generally, HARQ-ACK feedback for PDSCH includes HARQ-ACK feedback for SPS PDSCH reception (from the network side, it may also be referred to as "SPS PDSCH transmission"), HARQ-ACK feedback for dynamic scheduled PDSCH, and HARQ-ACK feedback for SPS PDSCH release. In accordance with NR Rel-15, a UE 105 can be configured with up to four PUCCH resource sets with each PUCCH resource set being configured by high layer signalling(s) to contain at least one PUCCH resource. In some embodiments of the present application, the high layer may represent a layer higher than the physical (PHY) layer, such as media access control (MAC) layer, a radio resource control (RRC) layer.

To improve flexibility in multi-TRP with both ideal and non-ideal backhaul, transmission of separate HARQ-ACK feedback for different TRPs in a single slot is expected. In a multi-TRP transmission scenario with ideal backhaul between different TRPs 103, different TRPs 103 can coordinate dynamically to ensure that PUCCH resources used to transmit HARQ-ACK feedback to different TRPs 103 are not overlapped in the same slot. However, for a multi-TRP transmission scenario with non-ideal backhaul supported between different TRPs 103, dynamic coordination cannot be achieved. Accordingly, a PUCCH resources indicated by independent downlink control information (DCI) received by the UE 105 from different TRPs 103 for HARQ-ACK transmission (HARQ-ACK feedback for multi-DCI based multiple TRPs) may be overlapped in time domain.

There are two modes of HARQ-ACK feedback of dynamic scheduled PDSCH (or DCI scheduled PDSCH) or SPS PDSCH release for multiple TRPs, i.e., separate feedback and joint feedback. For example, when the joint feedback mode is configured for multi-DCI based multiple TRPs, HARQ-ACK feedback corresponding to SPS PDSCH reception associated with multi-TRP just needs to follow the scheme specified in Rel-16. It means for only HARQ-ACK feedback corresponding to SPS PDSCH reception associated with multi-TRP without any HARQ-ACK feedback corresponding to DCI scheduled PDSCH, one PUCCH resource for carrying the HARQ-ACK feedback can be selected from SPS-PUCCH-AN-List according to the payload size which is drafted in TS 38.213 9.2.1 as shown in the following.

"If the UE is provided SPS-PUCCH-AN-List and transmits OUCI UCI information bits that include only HARQ-ACK information bits in response to one or more SPS PDSCH receptions, the UE determines a PUCCH resource to be
 a PUCCH resource with SPS-PUCCH-AN-ResourceID=0 if OUCI≤2, or
 a PUCCH resource with SPS-PUCCH-AN-ResourceID=1, if provided, if 2<OUCI≤N1, SPS where N1, SPS is either provided by maxPayloadSize in SPS-PUCCH-AN-List for SPS-PUCCH-AN-ResourceID=1 or is otherwise equal to 1706, or
 a PUCCH resource with SPS-PUCCH-AN-ResourceID=2, if provided, if N1, SPS<OUCI≤N2, SPS where N2, SPS is either provided by maxPayloadSize in SPS-PUCCH-AN-List for SPS-PUCCH-AN-ResourceID=2 or is otherwise equal to 1706, or
 a PUCCH resource with SPS-PUCCH-AN-ResourceID=3, if provided, if N2, SPS<OUCI≤N3, SPS where N3, SPS is equal to 1706."

Given the above agreement, for the joint feedback mode, HARQ-ACK feedback for SPS PDSCH reception associated with multi-TRP can be multiplexed with HARQ-ACK feedback for at least one of dynamic scheduled PDSCH and SPS PDSCH release, and the HARQ-ACK feedback for SPS PDSCH reception associated with multi-TRP can be appended after the HARQ-ACK feedback bits for at least one of dynamic scheduled PDSCH and SPS PDSCH release. Thus, embodiments of the present application propose no changes to the current HARQ-ACK feedback for SPS PDSCH reception associated with multi-TRP when the mode of joint feedback is configured in multi-DCI based multiple TRPs.

However, when the separate feedback mode is configured for multi-DCI based multiple TRPs, it is not clear and not complete in the current NR specification about the HARQ-ACK feedback of multiple SPS PDSCH receptions associated with multi-TRP.

Figure 2:
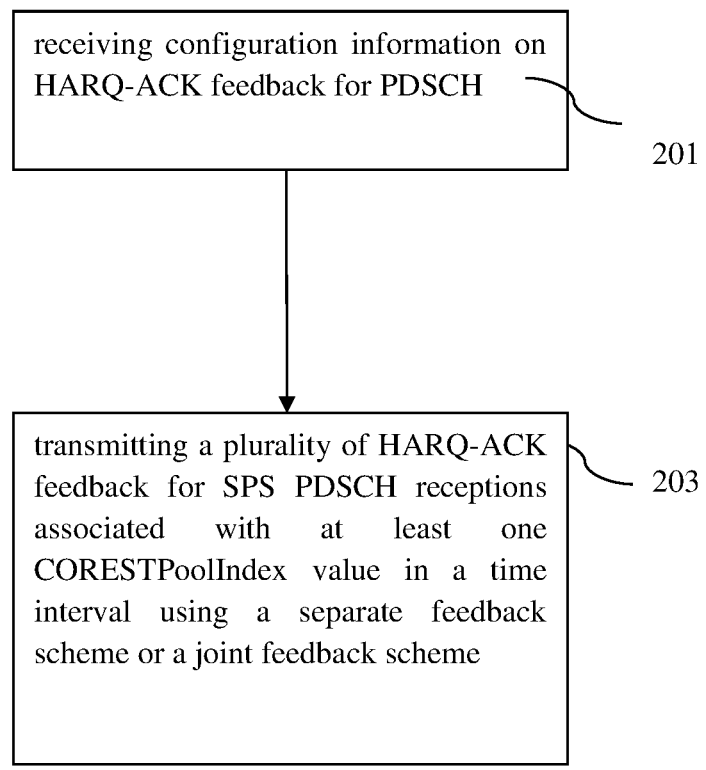
FIG. 2 is a flow chart illustrating a method for HARQ-ACK feedback in multi-TRP transmission according to some embodiments of the present application.
Figure 3:
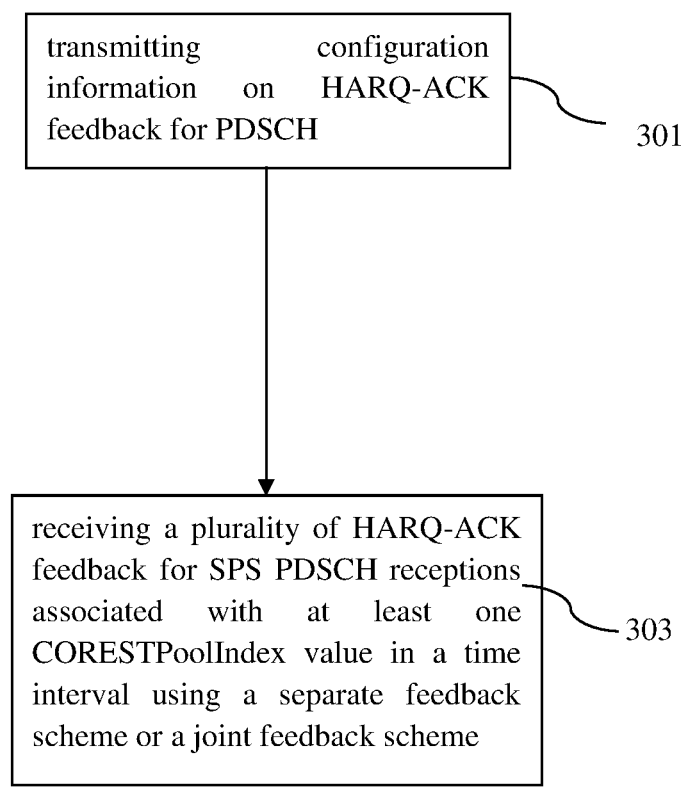
FIG. 3 is a flow chart illustrating a method for HARQ-ACK feedback in multi-TRP transmission according to some other embodiments of the present application.

According to embodiments of the present application, different strategies can be applied to solve the technical problem concerning how to transmit HARQ-ACK feedback of SPS PDSCH reception associated with multi-TRP in the same time interval. FIG. 2 and FIG. 3 illustrate a basic solution implemented on a UE side and network side, respectively, according to some embodiments of the present application. For simplicity, for a CORESETPoolIndex value (or a TRP), any of HARQ-ACK feedback for dynamic scheduled PDSCH and HARQ-ACK feedback for SPS PDSCH release is represented by "HARQ-ACK feedback excluding that for SPS PDSCH reception" hereafter.

Specifically, FIG. 2 is a flow chart illustrating a method for HARQ-ACK feedback in multi-TRP transmission according to some embodiments of the present application, which can be performed by a UE or the like.

As shown in FIG. 2, in step 201, configuration information on HARQ-ACK feedback for PDSCH is received, for example by the UE 105 from the network side. The configuration information at least indicates a plurality of CORESETPoolIndex values and a separate feedback mode for HARQ-ACK feedback excluding that for SPS PDSCH reception associated with different CORESETPoolIndex values. Each CORESETPoolIndex value is associated with at least one PUCCH resource. According to embodiments of the present application, HARQ-ACK feedback for a SPS PDSCH reception may be associated with a corresponding CORESETPoolIndex value configured for a control resource set (CORESET) where an activated PDCCH of the SPS PDSCH reception is received. As stated above, each CORESETPoolIndex value identifies a TRP. Since SPS PDSCH reception is activated by a PDCCH transmitted in a CORESET and multiple SPS PDSCH receptions can be configured in a bandwidth part (BWP) of a serving cell, each TRP can activate multiple SPS PDSCH receptions accordingly.

In some embodiments of the present application, for each CORESETPoolIndex value, the at least one PUCCH resource associated with the CORESETPoolIndex value can be separately configured by RRC signalling. That is, a RRC signalling can configure at least one PUCCH resource for a CORESETPoolIndex value independently, and there are a plurality of RRC signalings for configuring PUCCH resources associated with the plurality of CORESETPoolIndex values. In some embodiments of the present application, for each CORESETPoolIndex value, the at least one PUCCH resource associated with the CORESETPoolIndex value is a subset of a set of PUCCH resources configured with the CORESETPoolIndex value by one RRC signalling.

In step 203, a plurality of HARQ-ACK feedback for SPS PDSCH receptions associated with at least one CORESETPoolIndex value can be transmitted in a time interval using a separate feedback scheme or a joint feedback scheme. According to embodiments of the present application, a time interval can be a slot, or a sub-slot etc. Whether to use a separate feedback scheme or a joint feedback scheme is predefined in the specification or configured by RRC signalling. In the case of using the separate feedback scheme, for each CORESETPoolIndex value, all HARQ-ACK feedback for SPS PDSCH reception associated with the CORESETPoolIndex value is transmitted in a corresponding associated PUCCH resource. In the case of using the joint feedback scheme, all HARQ-ACK feedback for SPS PDSCH receptions associated with all CORESETPoolIndex values is transmitted in a PUCCH resource associated with a single CORESETPoolIndex value of the plurality of CORESETPoolIndex values.

On the network side, a similar HARQ-ACK feedback procedure can be performed. For example, FIG. 3 is a flow chart illustrating a method for HARQ-ACK feedback in multi-TRP transmission according to some other embodiments of the present application, which can be performed by a BS or the like. Considering the consistency between the network side and UE side, the exemplary HARQ-ACK feedback procedure will be briefly illustrated in the network side.

As shown in FIG. 3, configuration information on HARQ-ACK feedback for PDSCH can be transmitted in step 301, e.g., from a BS to a UE. The configuration information at least indicates a plurality of CORESETPoolIndex values and a separate feedback mode for HARQ-ACK feedback excluding that for SPS PDSCH reception associated with different CORESETPoolIndex values, each CORESETPoolIndex value being associated with at least one PUCCH resource.

In step 303, a plurality of HARQ-ACK feedback for SPS PDSCH receptions associated with at least one CORESETPoolIndex value can be received, e.g., from a UE in a time interval using a separate feedback scheme or a joint feedback scheme. In the case of using the separate feedback scheme, for each CORESETPoolIndex value, all HARQ-ACK feedback for SPS PDSCH reception associated with the CORESETPoolIndex value is received in a corresponding associated PUCCH resource. In the case of using the joint feedback scheme, all HARQ-ACK feedback for SPS PDSCH receptions associated with all CORESETPoolIndex values is received in a PUCCH resource associated with a single CORESETPoolIndex value of the plurality of CORESETPoolIndex values.

Based on the above basic solutions, more details will be illustrated in various embodiments hereafter. Although HARQ-ACK feedback excluding that for SPS PDSCH reception (e.g., HARQ-ACK feedback for dynamic scheduled PDSCH and/or for SPS PDSCH release, or HARQ-ACK feedback for any of dynamic scheduled PDSCH and SPS PDSCH release) should be separated feedback when a separate feedback mode is configured, multiple HARQ-ACK feedback for SPS PDSCH receptions of different TRPs can be jointly transmitted to one TRP considering the requirement of timeliness of HARQ-ACK feedback for SPS PDSCH receptions is much lower than HARQ-ACK feedback of dynamic scheduled PDSCHs or separate feedback which is aligned with the HARQ-ACK feedback for dynamic scheduled PDSCHs. Therefore, in each following case, joint feedback and separate feedback scheme of HARQ-ACK for SPS PDSCH receptions are illustrated separately. Besides, the PUCCH resource determination for HARQ-ACK feedback only for SPS PDSCH reception and HARQ-ACK feedback for SPS PDSCH reception multiplexed with HARQ-ACK feedback excluding that for SPS PDSCH reception are different, which will also be discussed these separately in each feedback mode.

In addition, for simplicity, in the following exemplary embodiments, only two CORESETPoolIndex values, e.g., CORESETPoolIndex 0 and CORESETPoolIndex 1 are used for illustration, and a time interval is a slot. Persons skilled in the art can easily conceive of applying the technical solutions of the present application to more CORESETPoolIndex values and any instance of a time interval.

Separate Feedback Scheme

Case 1: For a CORESETPoolIndex value, there is only HARQ-ACK feedback for SPS PDSCH reception associated with the CORESETPoolIndex value without any HARQ-ACK feedback excluding that for SPS PDSCH reception associated with the CORESETPoolIndex value in the same slot.

In the case of using the separate feedback scheme, for each CORESETPoolIndex value, when there is only HARQ-ACK feedback for SPS PDSCH reception associated with the CORESETPoolIndex value in the time interval, the corresponding associated PUCCH resource is determined from the at least one PUCCH resource associated with the CORESETPoolIndex value based on the payload size of bits of all HARQ-ACK feedback for SPS PDSCH receptions associated with the CORESETPoolIndex value.

According some embodiments of the present application, for each CORESETPoolIndex value, the at least one PUCCH resource associated with the CORESETPoolIndex value is separately configured by RRC signalling. For example, two PUCCH resource lists, e.g., SPS-PUCCH-AN-List0 and SPS-PUCCH-AN-List1 can be configured for the two CORESETPoolIndex values, wherein SPS-PUCCH-AN-List0 is associated with CORESETPoolIndex 0 and SPS-PUCCH-AN-List1 is associated with CORESETPoolIndex 1. Each PUCCH resource list provides at least one PUCCH resource associated with the corresponding CORESETPoolIndex value.

For CORESETPoolIndex 0, when there are only HARQ-ACK (feedback) bits corresponding to SPS PDSCH receptions associated with CORESETPoolIndex 0, that is, there is no HARQ-ACK feedback for any of dynamic scheduled PDSCH and SPS PDSCH release associated with CORESETPoolIndex 0 in a slot, a HARQ-ACK codebook associated with CORESETPoolIndex 0, e.g., HARQ-ACK codebook 0 is only composed of all bits of HARQ-ACK feedback for SPS PDSCH receptions associated with CORESETPoolIndex 0. HARQ-ACK codebook 0 is transmitted by a PUCCH resource selected from SPS-PUCCH-AN-List0 according to the total payload sizes of HARQ-ACK bits associated with CORESETPoolIndex 0.

Similarly, for CORESETPoolIndex 1, when there are only HARQ-ACK bits corresponding to SPS PDSCH receptions associated with CORESETPoolIndex 1, that is, there is no HARQ-ACK feedback for any of dynamic scheduled PDSCH and SPS PDSCH release associated with CORESETPoolIndex 1 in the same slot, a HARQ-ACK codebook associated with CORESETPoolIndex 1, e.g., HARQ-ACK codebook 1 is only composed of all HARQ-ACK bits corresponding to SPS PDSCH receptions associated with CORESETPoolIndex 1. HARQ-ACK codebook 1 is transmitted by another PUCCH resource selected from SPS-PUCCH-AN-List1 according to the total payload sizes of HARQ-ACK bits associated with CORESETPoolIndex 1.

Figure 4:
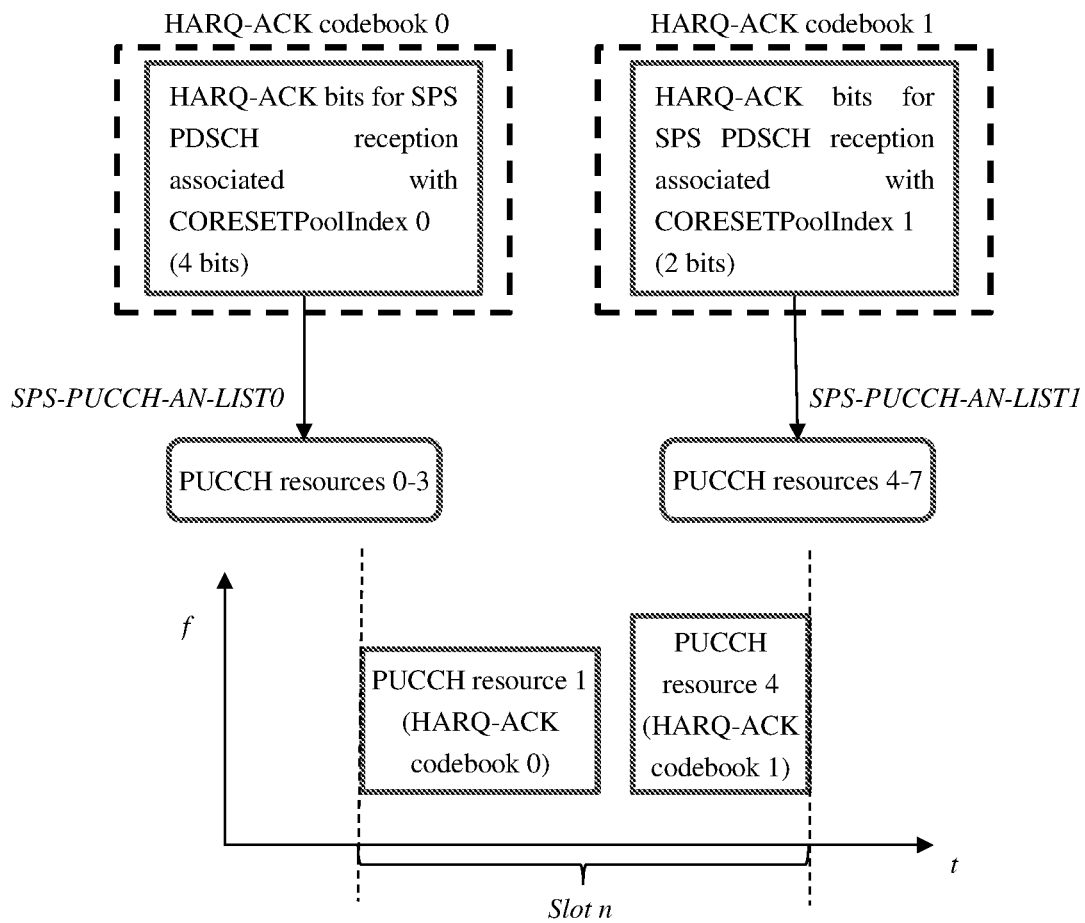
FIG. 4 illustrates an exemplary HARQ feedback diagram with separate HARQ-ACK codebooks for SPS PDSCH reception according to some embodiments of the present application.

FIG. 4 illustrates an exemplary HARQ feedback diagram with separate HARQ-ACK codebooks for SPS PDSCH reception according to some embodiments of the present application, wherein separate PUCCH resource lists are configured.

Referring to FIG. 4, there are 4 PUCCH resources (PUCCH resources 0-3) in SPS-PUCCH-AN-List0 and there are 4 PUCCH resources (PUCCH resources 4-7) in SPS-PUCCH-AN-List1. Corresponding to slot n (to be transmitted in the UE side in slot n), 4 HARQ-ACK bits corresponding to SPS PDSCH receptions are associated with CORESETPoolIndex 0 and 2 HARQ-ACK bits corresponding to SPS PDSCH receptions are associated with CORESETPoolIndex 1. In addition, for both CORESETPoolIndex 0 and CORESETPoolIndex 1, there is no HARQ-ACK feedback for any of dynamic scheduled PDSCH and SPS PDSCH release. Thus, HARQ-ACK codebook 0 is composed of only HARQ-ACK bits for SPS PDSCH reception associated with CORESETPoolIndex 0 and HARQ-ACK codebook 1 is composed of only HARQ-ACK bits for SPS PDSCH reception associated with CORESETPoolIndex 1. As described above, a PUCCH resource (e.g., PUCCH resource 1 in FIG. 4) will be selected (or determined) from SPS-PUCCH-AN-List0 according to the payload size of all bits of the HARQ-ACK for SPS PDSCH reception associated with CORESETPoolIndex 0. Similarly, another PUCCH resource (e.g., PUCCH resource 4 in FIG. 4) will be selected from SPS-PUCCH-AN-List1 according to the payload size of all bits of the HARQ-ACK feedback for SPS PDSCH reception associated with CORESETPoolIndex 1. Accordingly, HARQ-ACK codebook 0 will be transmitted in PUCCH resource 1 and HARQ-ACK codebook 1 will be transmitted in PUCCH resource 4 in slot n.

According to some other embodiments of the present application, for each CORESETPoolIndex value, the at least one PUCCH resource associated with the CORESETPoolIndex value is a subset of a set of PUCCH resources configured with a CORESETPoolIndex value by one RRC signalling. For example, only one PUCCH resource list, e.g., SPS-PUCCH-AN-List as specified in Rel-16 is configured, wherein one subset of PUCCH resources in SPS-PUCCH- AN-List, e.g., subset 0 is associated with CORESETPoolIndex 0 and another subset of PUCCH resources, e.g., subset 1 in SPS-PUCCH-AN-List is associated with CORESETPoolIndex 1. Each subset of PUCCH resources in SPS-PUCCH-AN-List includes at least one PUCCH resource.

According to some embodiments of the present application, there are only HARQ-ACK bits corresponding to SPS PDSCH receptions associated with CORESETPoolIndex 0, that is, there is no HARQ-ACK feedback for any of dynamic scheduled PDSCH and SPS PDSCH release associated with CORESETPoolIndex 0 in a slot, a HARQ-ACK codebook associated with CORESETPoolIndex 0, e.g., HARQ-ACK codebook 0 is composed of only all HARQ-ACK bits corresponding to SPS PDSCH receptions associated with CORESETPoolIndex 0. The HARQ-ACK codebook associated with CORESETPoolIndex 0 is transmitted by a PUCCH resource selected from subset 0 according to the total payload sizes of HARQ-ACK bits associated with CORESETPoolIndex 0. Similarly, when there are only HARQ-ACK bits corresponding to SPS PDSCH receptions associated with CORESETPoolIndex 1, that is, there is no HARQ-ACK feedback for any of dynamic scheduled PDSCH and SPS PDSCH release associated with CORESETPoolIndex 1 in the same slot, a HARQ-ACK codebook associated with CORESETPoolIndex 1, e.g., HARQ-ACK codebook 1 is composed of only all HARQ-ACK bits corresponding to SPS PDSCH receptions associated with CORESETPoolIndex 1. The HARQ-ACK codebook associated with CORESETPoolIndex 1 is transmitted by a PUCCH resource selected from subset 1 according to the total payload sizes of HARQ-ACK bits associated with CORESETPoolIndex 1.

Figure 5:
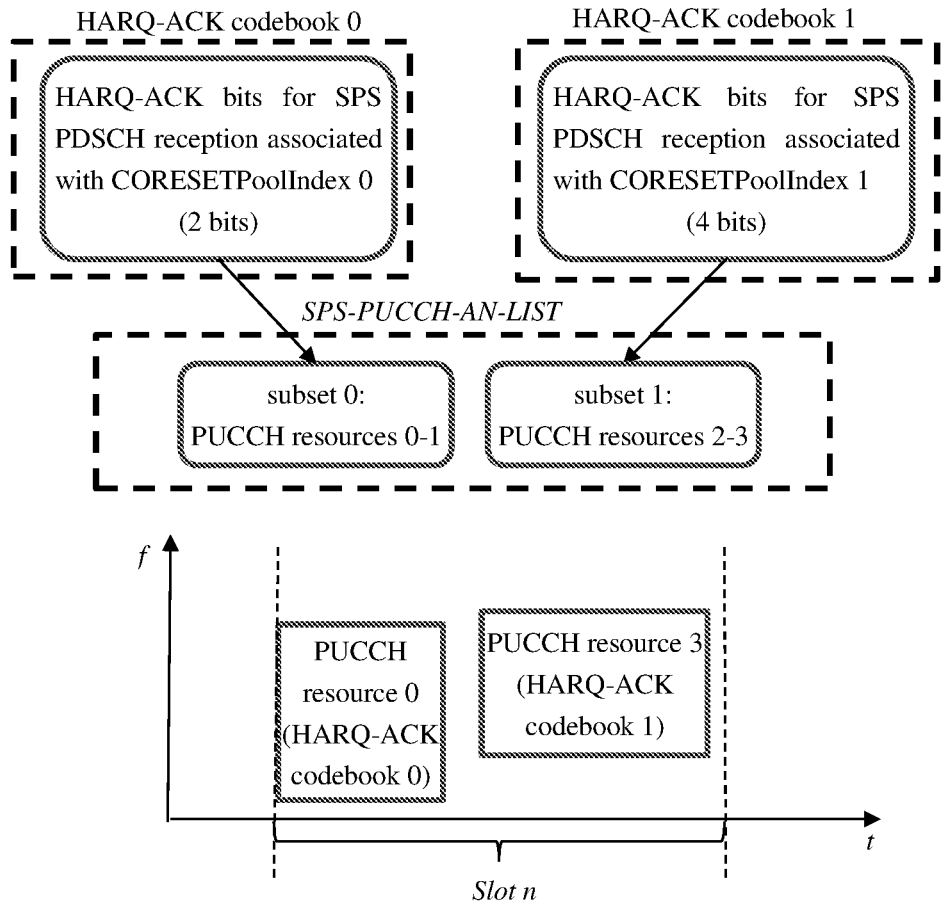
FIG. 5 illustrates an exemplary HARQ feedback diagram with separate HARQ-ACK codebooks for SPS PDSCH reception according to some other embodiments of the present application.

FIG. 5 illustrates an exemplary HARQ feedback diagram with separate HARQ-ACK codebooks for SPS PDSCH reception according to some other embodiments of the present application, wherein only one PUCCH resource list is configured.

Referring to FIG. 5, there are 4 PUCCH resources (PUCCH resources 0-3) in SPS-PUCCH-AN-List, wherein subset 0 includes PUCCH resources 0-1 associated with CORESETPoolIndex 0 and subset 1 includes PUCCH resources 2-3 associated with CORESETPoolIndex 1. Corresponding to slot n, 2 HARQ-ACK bits for SPS PDSCH receptions are associated with CORESETPoolIndex 0 and 4 HARQ-ACK bits for SPS PDSCH receptions are associated with CORESETPoolIndex 1. For both CORESETPoolIndex 0 and CORESETPoolIndex 1, there is no HARQ-ACK bit excluding that for SPS PDSCH reception to be transmitted in slot n. Thus, HARQ-ACK codebook 0 is composed of only HARQ-ACK bits for SPS PDSCH associated with CORESETPoolIndex 0 and HARQ-ACK codebook 1 is composed of only HARQ-ACK bits for SPS PDSCH reception associated with CORESETPoolIndex 1. As described above, a PUCCH resource (e.g., PUCCH resource 0 in FIG. 5) is selected from subset 0 according to the payload size of all HARQ-ACK bits of HARQ-ACK codebook 0 and another PUCCH resource (e.g., PUCCH resource 3 in FIG. 5) is selected from subset 1 according to the payload size of all HARQ-ACK bits of HARQ-ACK codebook 1.

Case 2: For a CORESETPoolIndex value, there is HARQ-ACK feedback for any of dynamic scheduled PDSCH and SPS PDSCH release associated with the CORESETPoolIndex value in a time interval besides the HARQ-ACK feedback for SPS PDSCH reception associated with the CORESETPoolIndex value. According to some embodiments of the present application, when there is HARQ-ACK feedback for any of dynamic scheduled PDSCH and SPS PDSCH release associated with the CORESETPoolIndex value in the time interval, the HARQ-ACK feedback for SPS PDSCH reception associated with the CORESETPoolIndex value is multiplexed with HARQ-ACK feedback for any of dynamic scheduled PDSCH and SPS PDSCH release associated with the CORESETPoolIndex value. The PUCCH resource for carrying corresponding HARQ-ACK feedback associated with a CORESETPoolIndex value is determined by last downlink control information (DCI) corresponding to the HARQ-ACK feedback for any of dynamic scheduled PDSCH and SPS PDSCH release associated with the CORESETPoolIndex value and a total payload size of bits of all the HARQ-ACK feedback for SPS PDSCH reception associated with the CORESETPoolIndex value and HARQ-ACK feedback for any of dynamic scheduled PDSCH and SPS PDSCH release associated with the CORESETPoolIndex value in the time interval.

For example, corresponding to a time interval, for CORESETPoolIndex 0, there are HARQ-ACK feedback for SPS PDSCH reception and HARQ-ACK feedback excluding that for SPS PDSCH reception. A HARQ-ACK codebook associated with CORESETPoolIndex 0, e.g., HARQ-ACK codebook 0 is generated for all HARQ-ACK feedback associated CORESETPoolIndex 0. The allocation of bits of the HARQ-ACK feedback for SPS PDSCH reception and the HARQ feedback excluding that for SPS PDSCH reception in HARQ-ACK codebook 0 can be the same scheme in Rel-16 specified in TS 38.213 9.1, or in other manners. The PUCCH resource for carrying HARQ-ACK codebook 0 can be determined by the last DCI corresponding to the HARQ-ACK feedback for any of dynamic scheduled PDSCH and SPS PDSCH release associated with CORESETPoolIndex 0 and the total size of all HARQ-ACK bits of HARQ-ACK codebook 0. Similarly, corresponding to a time interval, for another CORESETPoolIndex value, e.g., CORESETPoolIndex 1, when there are HARQ-ACK feedback for SPS PDSCH reception and HARQ-ACK feedback for any of dynamic scheduled PDSCH and SPS PDSCH release; a HARQ-ACK codebook associated with CORESETPoolIndex 1, e.g., HARQ-ACK codebook 1 can be generated and a PUCCH resource for carrying HARQ-ACK codebook 1 can be determined.

Figure 6:
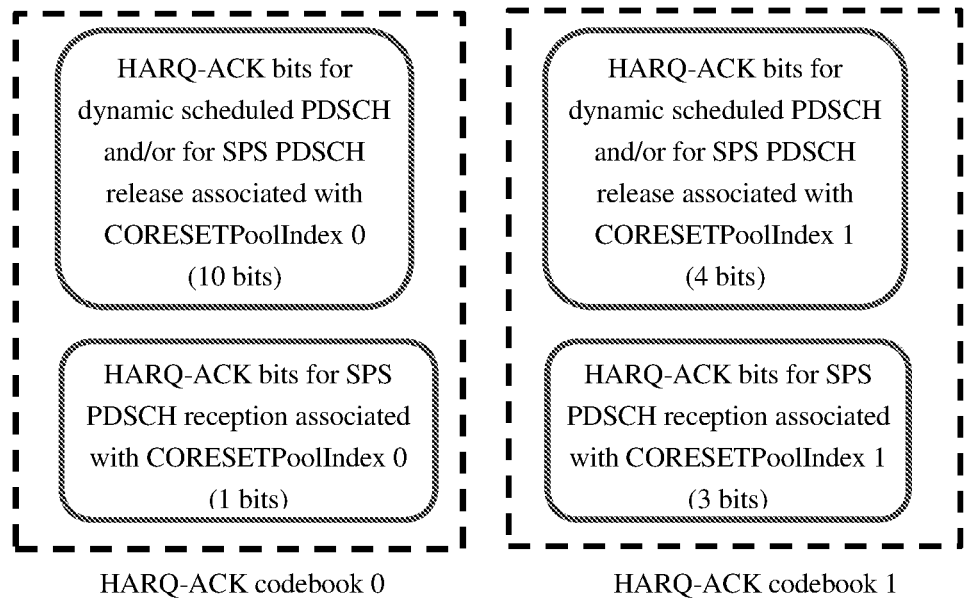
FIG. 6 illustrates an exemplary HARQ feedback diagram with separate HARQ-ACK codebooks for SPS PDSCH reception according to some yet other embodiments of the present application.
Figure 6:
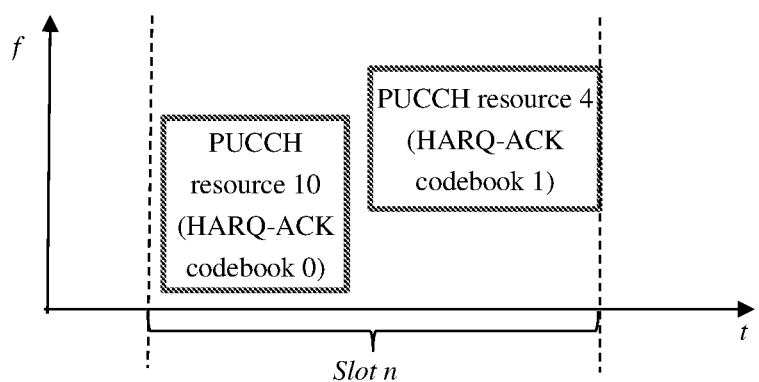

FIG. 6 illustrates an exemplary HARQ feedback diagram with separate HARQ-ACK codebooks for SPS PDSCH reception according to some yet other embodiments of the present application.

Referring to FIG. 6, corresponding to slot n, there are 10 HARQ-ACK bits for any of dynamic scheduled PDSCH and SPS PDSCH release associated with CORESETPoolIndex 0, and 4 HARQ-ACK bits for any of dynamic scheduled PDSCH and SPS PDSCH release associated with CORESETPoolIndex 1. In addition, corresponding to slot n, there are 1 HARQ-ACK bit for SPS PDSCH associated with CORESETPoolIndex 0 and 3 HARQ-ACK bits for SPS PDSCH associated with CORESETPoolIndex 1. HARQ-ACK codebook 0 associated with CORESETPoolIndex 0 is constructed by all the HARQ-ACK bits for SPS PDSCH reception associated with CORESETPoolIndex 0 and HARQ-ACK bits for any of dynamic scheduled PDSCH and SPS PDSCH release associated with CORESETPoolIndex 0, which are 11 bits in total as shown in FIG. 6. HARQ-ACK codebook 1 associated with CORESETPoolIndex 1 is constructed by all the HARQ ACK bits for SPS PDSCH reception associated with CORESETPoolIndex 1 and HARQ-ACK bits for any of dynamic scheduled PDSCH and SPS PDSCH release associated with CORESETPoolIndex 1, which are 7 bits in total as shown in FIG. 6. The PUCCH resource for carrying HARQ-ACK codebook 0, e.g., PUCCH resource 0 is determined according to the last DCI corresponding to the HARQ-ACK feedback for any of dynamic scheduled PDSCH and SPS PDSCH release associated with CORESETPoolIndex 0 and the payload size of all HARQ-ACK bits of HARQ-ACK codebook 0. The PUCCH resource for carrying HARQ-ACK codebook 1, e.g., PUCCH resource 4 is determined according to the last DCI corresponding to the HARQ-ACK feedback for any of dynamic scheduled PDSCH and SPS PDSCH release associated with CORESETPoolIndex 1 and the payload size of HARQ-ACK bits of HARQ-ACK codebook 1. Accordingly, HARQ-ACK codebook 0 will be transmitted in PUCCH resource 0 and HARQ-ACK codebook 1 will be transmitted in PUCCH resource 4 in slot n.

Figure 7:
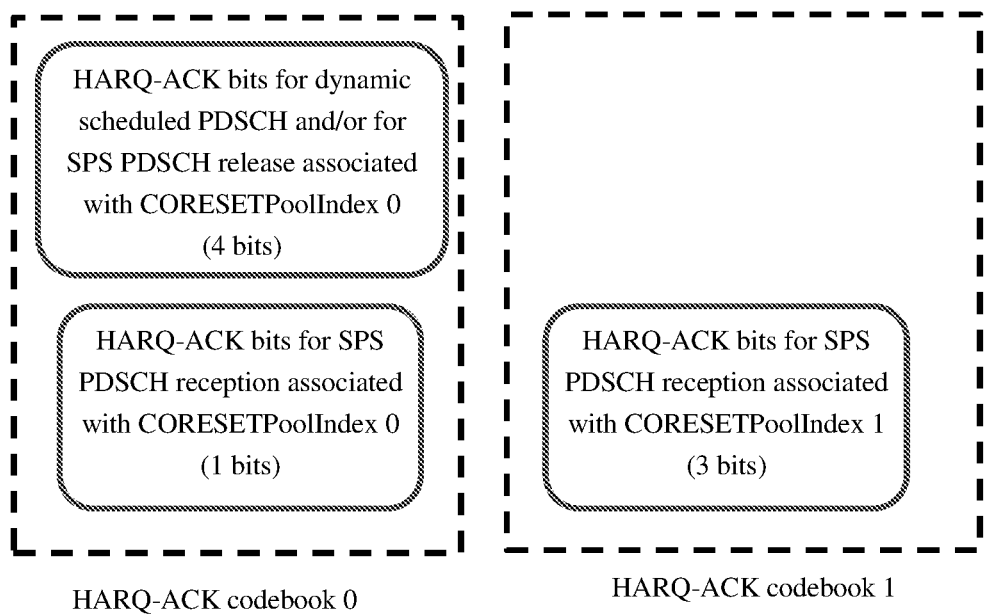
FIG. 7 illustrates an exemplary HARQ feedback diagram with separate HARQ-ACK codebooks for SPS PDSCH reception according to some yet other embodiments of the present application.
Figure 7:
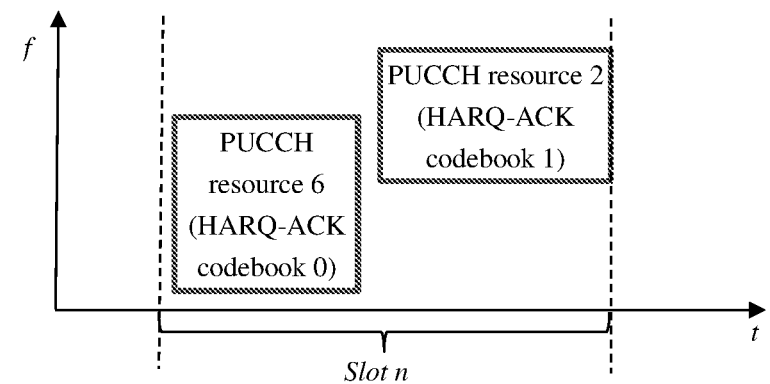

FIG. 7 illustrates an exemplary HARQ feedback diagram with separate HARQ-ACK codebooks for SPS PDSCH reception according to some yet other embodiments of the present application.

Referring to FIG. 7, corresponding to slot n, there are 4 HARQ-ACK bits for any of dynamic scheduled PDSCH and SPS PDSCH release associated with CORESETPoolIndex 0, while there is no HARQ-ACK bit for any of dynamic scheduled PDSCH and SPS PDSCH release associated with CORESETPoolIndex 1. Besides, corresponding to slot n, there are 1 HARQ-ACK bit for SPS PDSCH reception associated with CORESETPoolIndex 0 and 3 HARQ-ACK bits for SPS PDSCH associated with CORESETPoolIndex 1. Accordingly, HARQ-ACK codebook 0 associated with CORESETPoolIndex 0 is constructed by the HARQ-ACK bits for SPS PDSCH reception associated with CORESETPoolIndex 0 and HARQ-ACK bits for any of dynamic scheduled PDSCH and SPS PDSCH release associated with CORESETPoolIndex 0, which are 5 bits in total as shown in FIG. 7. HARQ-ACK codebook 1 associated with CORESETPoolIndex 1 is only constructed by the HARQ ACK bits for SPS PDSCH reception associated with CORESETPoolIndex 1, which are 3 bits in total as shown in FIG. 7. The PUCCH resource for carrying HARQ-ACK codebook 0, e.g., PUCCH resource 6 as shown in FIG. 7 can be determined by the last DCI corresponding to the HARQ-ACK feedback for any of dynamic scheduled PDSCH and SPS PDSCH release associated with CORESETPoolIndex 0 according to the total payload size of HARQ-ACK codebook 0. The PUCCH resource for carrying HARQ-ACK codebook 1, e.g., PUCCH resource 2 as shown in FIG. 7 can be selected from a subset of a PUCCH resource list configured as SPS-PUCCH-AN-List associated with CORESETPoolIndex 1 according to the payload size of HARQ-ACK codebook 1. Accordingly, HARQ-ACK codebook 0 will be transmitted in PUCCH resource 6 and HARQ-ACK codebook 1 will be transmitted in PUCCH resource 2 in slot n.

Since each HARQ-ACK codebook can be associated with a CORESETPoolIndex value which identifies a TRP, each TRP can determine the HARQ-ACK codebook associated with itself in separate feedback scheme. Each TRP will receive the HARQ-ACK codebook in a corresponding PUCCH resource which is determined according to the payload size of the HARQ-ACK codebook. The corresponding PUCCH resource is selected from at least one configured PUCCH resource associate with itself when there is HARQ-ACK feedback only for SPS PDSCH reception associated with the TRP, or is determined by the last DCI corresponding to the HARQ-ACK feedback for any of dynamic scheduled PDSCH and SPS PDSCH release associated with the TRP when there is both HARQ-ACK feedback for SPS PDSCH reception associated with the TRP and HARQ-ACK feedback for any of dynamic scheduled PDSCH and SPS PDSCH release associated with the TRP.

Joint Feedback Scheme

In joint feedback scheme, all HARQ-ACK feedback for SPS PDSCH receptions associated with all CORESETPoolIndex values is transmitted (or received) in a PUCCH resource associated with a single CORESETPoolIndex value of the plurality of CORESETPoolIndex values, which can be a predefined CORESETPoolIndex value or a RRC signalling configured CORESETPoolIndex value. For example, due to each CORESETPoolIndex value identifying a TRP, all HARQ-ACK feedback for PDSCH associated with two TRPs can be sent to only one of the two TRPs for processing.

Case 1: For a predefined or RRC signalling configured CORESETPoolIndex value associated with all HARQ-ACK feedback for SPS PDSCH receptions associated with all CORESETPoolIndex values in a time interval, there is only HARQ-ACK feedback for SPS PDSCH reception without HARQ-ACK feedback for any of dynamic scheduled PDSCH and SPS PDSCH release associated with the predefined or RRC signaling configured CORESETPoolIndex value. In this case, the PUCCH resource for carrying all the HARQ-ACK feedback for SPS PDSCH receptions associated with all CORESETPoolIndex values is selected from the at least one PUCCH resource configured as SPS-PUCCH-AN-LIST based on the payload size of bits of all HARQ-ACK feedback for SPS PDSCH reception associated with all CORESETPoolIndex values. The at least one PUCCH resource is associated with the predefined or RRC signalling configured CORESETPoolIndex value, which can be realized by gNB's implementation and doesn't need RRC configuration.

According to some embodiments of the present application, a scheme similar to that in Rel-16 can be used. That is, at least one PUCCH resource associated with the predefined or RRC signalling configured CORESETPoolIndex value can be provided by a configured PUCCH resource list, e.g., SPS-PUCCH-AN-List. A PUCCH resource in the PUCCH resource list will be selected according to the payload size of all bits of the HARQ-ACK feedback for all SPS PDSCH receptions in this time interval as the same as in TS 38.213 9.2.1. Accordingly, all the HARQ-ACK bits are transmitted to one TRP identified by the predefined or RRC signalling configured CORESETPoolIndex value. The HARQ-ACK bits for SPS PDSCH receptions activated by other TRP(s) identified by remaining CORESETPoolIndex values can be delivered to the other TRP(s) by the corresponding backhaul between another TRP and the TRP identified by the predefined or RRC signalling configured CORESETPoolIndex value.

Figure 8:
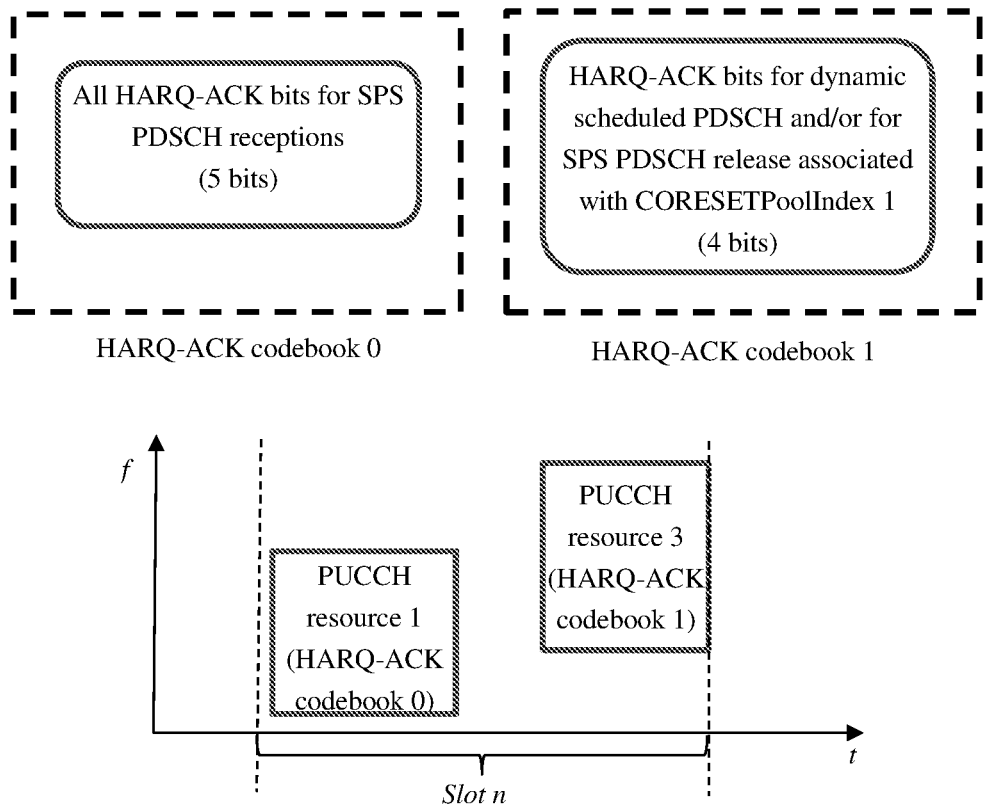
FIG. 8 illustrates an exemplary HARQ feedback diagram with a joint HARQ-ACK codebook for SPS PDSCH reception according to some embodiments of the present application.

FIG. 8 illustrates an exemplary HARQ feedback diagram with a joint HARQ-ACK codebook for SPS PDSCH reception according to some embodiments of the present application.

Referring to FIG. 8, for CORESETPoolIndex 0, corresponding to slot n, there are only 2 HARQ-ACK bits for SPS PDSCH reception without any bit for HARQ feedback excluding that for SPS PDSCH reception. For CORESETPoolIndex 1, corresponding to slot n, there are 3 HARQ-ACK bits for SPS PDSCH reception and 4 HARQ-ACK bits excluding that for SPS PDSCH reception. Assuming that CORESETPoolIndex 0 is the CORESETPoolIndex value predefined in the specification or RRC signalling configured, all HARQ-ACK feedback for SPS PDSCH reception associated with both CORESETPoolIndex 0 and CORESETPoolIndex 1 will be transmitted in a PUCCH resource associated with CORESETPoolIndex 0. Accordingly, the HARQ-ACK codebook associated with CORESETPoolIndex 0, e.g., HARQ-ACK codebook 0 is composed of all HARQ-ACK feedback bits for SPS PDSCH reception associated with both CORESETPoolIndex 0 and CORESETPoolIndex 1, i.e., 5 bits in total as shown in FIG. 8. The HARQ-ACK codebook associated with CORESETPoolIndex 1, e.g., HARQ-ACK codebook 1 is only composed of all bits of HARQ-ACK feedback for any of dynamic scheduled PDSCH and SPS PDSCH release associated with CORESETPoolIndex 1, i.e., 4 bits. A PUCCH resource, e.g., PUCCH resource 1 shown in FIG. 8 is selected from at least one PUCCH resource associated with CORESETPoolIndex 0, e.g., SPS-PUCCH-AN-List according to the payload size of HARQ-ACK codebook 0. Another PUCCH resource, e.g., PUCCH resource 3 shown in FIG. 8 is determined for HARQ-ACK codebook 1 according the last DCI corresponding to HARQ feedback for any of dynamic scheduled PDSCH and SPS PDSCH release associated with CORESETPoolIndex 1. Accordingly, HARQ-ACK codebook 0 will be transmitted in PUCCH resource 1 and HARQ-ACK codebook 1 will be transmitted in PUCCH resource 3 in slot n.

Case 2: For a predefined or RRC signalling configured CORESETPoolIndex value, there are HARQ-ACK feedback bit(s) for SPS PDSCH reception multiplexed with HARQ-ACK feedback bit(s) excluding that for SPS PDSCH reception in the same time interval. When there is HARQ-ACK feedback for any of dynamic scheduled PDSCH and SPS PDSCH release associated with the predefined or RRC signalling configured CORESETPoolIndex value in the time interval, the HARQ-ACK feedback for SPS PDSCH reception associated with all CORESETPoolIndex values is multiplexed with the HARQ-ACK feedback for any of dynamic scheduled PDSCH and SPS PDSCH release associated with the predefined or RRC signalling configured CORESETPoolIndex value. The PUCCH resource is determined by last DCI corresponding to the HARQ-ACK feedback for any of dynamic scheduled PDSCH and SPS PDSCH release associated with the predefined or RRC signalling configured CORESETPoolIndex value and a total payload size of bits of all HARQ-ACK feedback for SPS PDSCH reception associated with all CORESETPoolIndex values and the HARQ-ACK feedback for any of dynamic scheduled PDSCH and SPS PDSCH release associated with the predefined or RRC signalling configured CORESETPoolIndex value.

According to some embodiments of the present application, all HARQ-ACK bits for SPS PDSCH receptions are included in the HARQ-ACK codebook associated with the predefined or RRC signalling configured CORESETPoolIndex value as disclosed above. The allocation of all bits of HARQ-ACK feedback for SPS PDSCH reception associated with all CORESETPoolIndex values in a corresponding HARQ-ACK codebook may be the same as the scheme specified in TS 38.213 9.1. The PUCCH resource for carrying the corresponding HARQ-ACK codebook may be the same as the scheme specified in TS 38.213 9.2.3.

Figure 9:
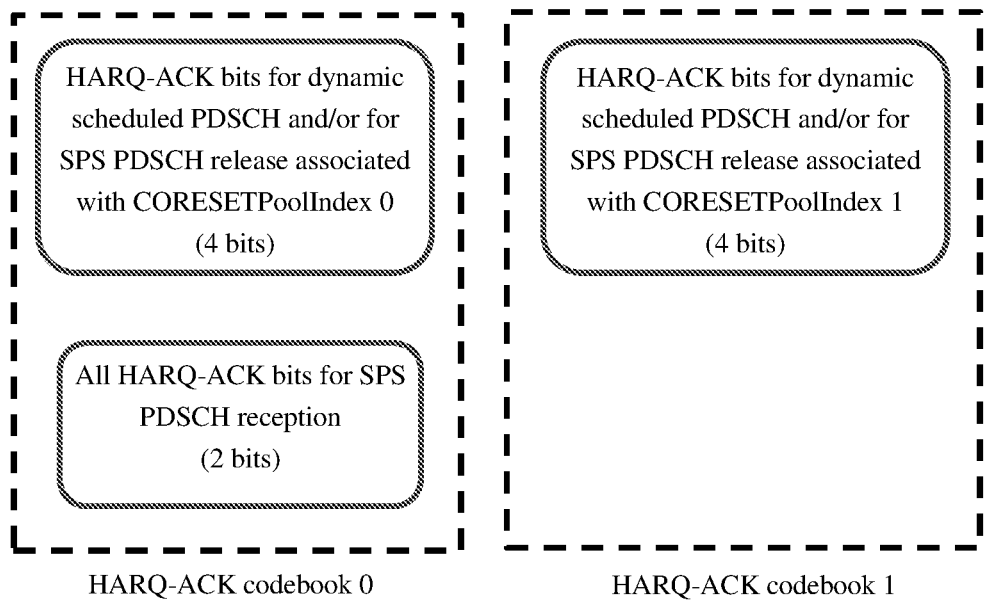
FIG. 9 illustrates an exemplary HARQ feedback diagram with a joint HARQ-ACK codebook for SPS PDSCH reception according to some other embodiments of the present application.
Figure 9:
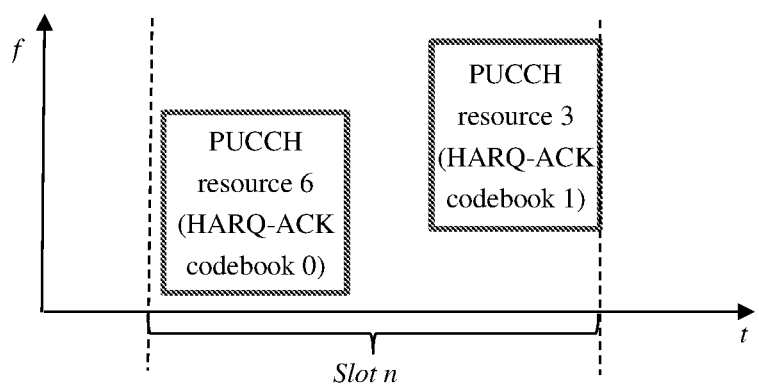

FIG. 9 illustrates an exemplary HARQ feedback diagram with a joint HARQ-ACK codebook for SPS PDSCH reception according to some other embodiments of the present application.

Referring to FIG. 9, corresponding to slot n, there are 4 HARQ-ACK bits for any of dynamic scheduled PDSCH and SPS PDSCH release associated with CORESETPoolIndex 0 and 4 HARQ-ACK bits for any of dynamic scheduled PDSCH and SPS PDSCH release associated with CORESETPoolIndex 1. Besides, corresponding to slot n, there are 2 HARQ-ACK bits for SPS PDSCH reception associated with both CORESETPoolIndex 0 and CORESETPoolIndex 1. As predefined in the specification or RRC signalling configured, all bits of HARQ-ACK feedback for SPS PDSCH receptions will be included in the HARQ-ACK codebook associated with CORESETPoolIndex 0 (as above assumed, only for example). Accordingly, the HARQ-ACK codebook associated with CORESETPoolIndex 0, e.g., HARQ-ACK codebook 0 includes 4 HARQ-ACK bits for any of dynamic scheduled PDSCH and SPS PDSCH release associated with CORESETPoolIndex 0, and 2 HARQ-ACK bits for SPS PDSCH reception associated with both CORESETPoolIndex 0 and CORESETPoolIndex 1. HARQ-ACK codebook associated with CORESETPoolIndex 1, e.g., HARQ-ACK codebook 1 only includes 4 bits of HARQ-ACK feedback for any of dynamic scheduled PDSCH and SPS PDSCH release associated with CORESETPoolIndex 1. A PUCCH resource, e.g., PUCCH resource 6 shown in FIG. 9 is determined for HARQ-ACK codebook 0 according the last DCI corresponding to the HARQ-ACK feedback for any of dynamic scheduled PDSCH and SPS PDSCH release associated with CORESETPoolIndex 0 and the payload size of HARQ-ACK codebook 0. Another PUCCH resource, e.g., PUCCH resource 3 shown in FIG. 9 is determined for HARQ-ACK codebook 1 according to the last DCI corresponding to HARQ-ACK feedback for any of dynamic scheduled PDSCH and SPS PDSCH release associated with CORESETPoolIndex 1 and the payload size of HARQ-ACK codebook 1. Accordingly, HARQ-ACK codebook 0 will be transmitted in PUCCH resource 6 and HARQ-ACK codebook 1 will be transmitted in PUCCH resource 3 in slot n.

Embodiments of the present application also propose an apparatus for HARQ-ACK feedback in multi-TRP transmission. For example, FIG. 10 illustrates a block diagram of an apparatus 1000 for HARQ-ACK feedback in multi-TRP transmission according to some embodiments of the present application.

Figure 10:
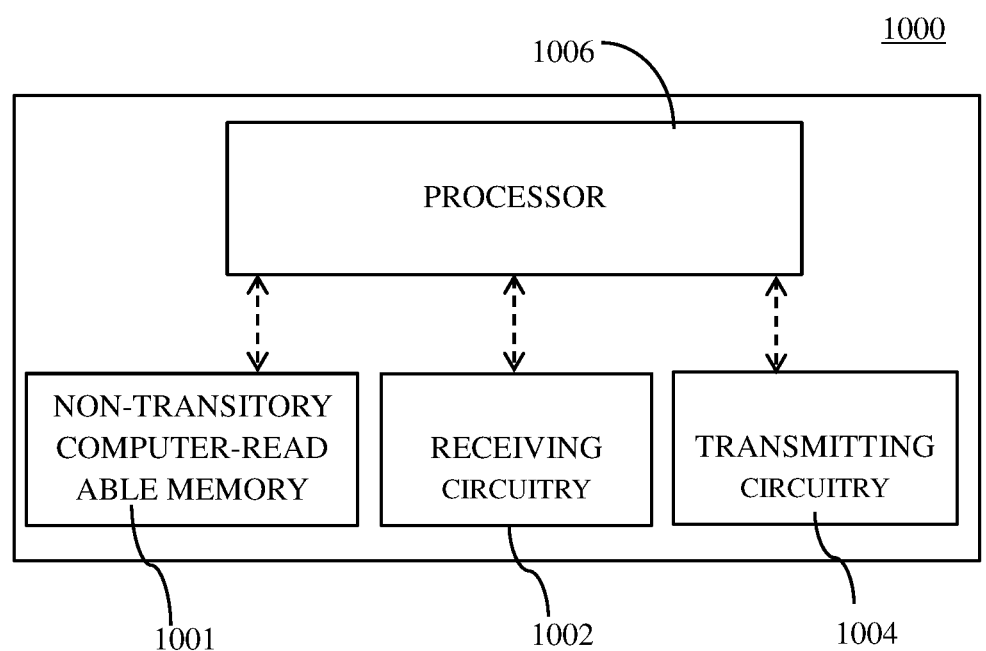
FIG. 10 illustrates a block diagram of an apparatus for HARQ-ACK feedback in multi-TRP transmission according to some embodiments of the present application.

As shown in FIG. 10, the apparatus 1000 may include at least one non-transitory computer-readable medium 1001, at least one receiving circuitry 1002, at least one transmitting circuitry 1004, and at least one processor 1006 coupled to the non-transitory computer-readable medium 1001, the receiving circuitry 1002 and the transmitting circuitry 1004. The apparatus 1000 may be a network side apparatus (e.g., a BS) configured to perform a method illustrated in FIG. 3 and the like, or a remote unit (e.g., a UE) configured to perform a method illustrated in FIG. 2 or the like.

Although in this figure, elements such as the at least one processor 1006, transmitting circuitry 1004, and receiving circuitry 1002 are described in the singular, the plural is contemplated unless a limitation to the singular is explicitly stated. In some embodiments of the present application, the receiving circuitry 1002 and the transmitting circuitry 1004 can be combined into a single device, such as a transceiver. In certain embodiments of the present application, the apparatus 1000 may further include an input device, a memory, and/or other components.

For example, in some embodiments of the present application, the non-transitory computer-readable medium 1001 may have stored thereon computer-executable instructions to cause a processor to implement the method with respect to the UE as described above. For example, the computer-executable instructions, when executed, cause the processor 1006 interacting with receiving circuitry 1002 and transmitting circuitry 1004, so as to perform the steps with respect to the UE depicted in FIG. 2.

In some embodiments of the present application, the non-transitory computer-readable medium 1001 may have stored thereon computer-executable instructions to cause a processor to implement the method with respect to the BS as described above. For example, the computer-executable instructions, when executed, cause the processor 1006 interacting with receiving circuitry 1002 and transmitting circuitry 1004, so as to perform the steps with respect to the BS depicted in FIG. 3.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A method, comprising:
receiving configuration information on hybrid automatic repeat request-acknowledge (HARQ-ACK) feedback for physical downlink shared channel (PDSCH), wherein the configuration information at least indicates a plurality of CORESETPoolIndex values and a separate feedback mode for HARQ-ACK feedback excluding that for semi-persistent scheduling (SPS) PDSCH reception associated with different CORESETPoolIndex values, each CORESETPoolIndex value being associated with at least one physical uplink control channel (PUCCH) resource; and
transmitting a plurality of HARQ-ACK feedback for SPS PDSCH reception associated with at least one CORESETPoolIndex value in a time interval using a separate feedback scheme or a joint feedback scheme, wherein:
while using the separate feedback scheme, for each CORESETPoolIndex value, all HARQ-ACK feedback for SPS PDSCH reception associated with the CORESETPoolIndex value is transmitted in a corresponding associated PUCCH resource; and
while using the joint feedback scheme, all HARQ-ACK feedback for SPS PDSCH reception associated with all CORESETPoolIndex values is transmitted in a PUCCH resource associated with a single CORESETPoolIndex value of the plurality of CORESETPoolIndex values.

2. The method according to claim 1, wherein a HARQ-ACK feedback for a SPS PDSCH reception is associated with a corresponding CORESETPoolIndex value configured for a control resource set (CORESET) where an activated physical downlink control channel (PDCCH) of the SPS PDSCH reception is received.

3. The method according to claim 1, wherein in the case of using the separate feedback scheme, for each CORESETPoolIndex value, when there is only HARQ-ACK feedback for SPS PDSCH reception associated with the CORESETPoolIndex value in the time interval, the corresponding associated PUCCH resource is determined from the at least one PUCCH resource associated with the CORESETPoolIndex value based on the payload size of bits of all HARQ-ACK feedback for SPS PDSCH receptions associated with the CORESETPoolIndex value.

4. The method according to claim 1, wherein in the case of using the separate feedback scheme, for each CORESETPoolIndex value, when there is HARQ-ACK feedback excluding that for SPS PDSCH reception associated with the CORESETPoolIndex value in the time interval, the HARQ-ACK feedback for SPS PDSCH reception associated with the CORESETPoolIndex value is multiplexed with the HARQ-ACK feedback excluding that for SPS PDSCH reception associated with the CORESETPoolIndex value.

5. The method according to claim 4, wherein the corresponding associated PUCCH resource is determined by last downlink control information (DCI) corresponding to the HARQ-ACK feedback excluding that for SPS PDSCH reception associated with the CORESETPoolIndex value and a total payload size of bits of all the HARQ-ACK feedback for SPS PDSCH reception associated with the CORESETPoolIndex value and the HARQ-ACK feedback excluding that SPS PDSCH reception associated with the CORESETPoolIndex value in the time interval.

6. The method according to claim 1, wherein in the case of using the joint feedback scheme, the single CORESETPoolIndex value associated with the corresponding PUCCH resource is predefined or configured by radio resource control (RRC) signalling.

7. The method according to claim 1, wherein in the case of using the joint feedback scheme, for the single CORESETPoolIndex value, when there is only HARQ-ACK feedback for SPS PDSCH reception associated with the single CORESETPoolIndex value in the time interval, the PUCCH resource is selected from the at least one PUCCH resource associated with the single CORESETPoolIndex value based on the payload size of bits of all HARQ-ACK feedback for SPS PDSCH reception associated with all CORESETPoolIndex values.

8. The method according to claim 1, wherein in the case of using the joint feedback scheme, for the single CORESETPoolIndex value, when there is HARQ-ACK feedback excluding that for SPS PDSCH reception associated with the single CORESETPoolIndex value in the time interval, the HARQ-ACK feedback for SPS PDSCH reception associated with all CORESETPoolIndex values is multiplexed with the HARQ-ACK feedback associated with the single CORESETPoolIndex value excluding that for SPS PDSCH reception associated with the single CORESETPoolIndex value.

9. The method according to claim 8, wherein the PUCCH resource is determined by last downlink control information (DCI) corresponding to the HARQ-ACK feedback associated with the single CORESETPoolIndex value excluding that for SPS PDSCH reception associated with the single CORESETPoolIndex value and a total payload size of bits of all HARQ-ACK feedback for SPS PDSCH reception associated with all CORESETPoolIndex values and the HARQ-ACK feedback associated with the single CORESETPoolIndex value excluding that for SPS PDSCH reception associated with the single CORESETPoolIndex value.

10. The method according to claim 3, wherein for each CORESETPoolIndex value, the at least one PUCCH resource associated with the CORESETPoolIndex value is separately configured by radio resource control (RRC) signalling.

11. The method according to claim 3, wherein for each CORESETPoolIndex value, the at least one PUCCH resource associated with the CORESETPoolIndex value is a subset of a set of PUCCH resources configured with the CORESETPoolIndex value by one radio resource control (RRC) signalling.

12. The method according to claim 1, wherein the plurality of CORESETPoolIndex values are two CORESETPoolIndex values.

13. The method according to claim 1, wherein using a separate feedback scheme or a joint feedback scheme is predefined or configured by radio resource control (RRC) signalling.

14. An apparatus comprising:
a processor; and
a memory coupled to the processor, the processor configured to cause the apparatus to:
 transmit configuration information on hybrid automatic repeat request-acknowledge (HARQ-ACK) feedback for physical downlink shared channel (PDSCH), wherein the configuration information at least indicates a plurality of CORESETPoolIndex values and a separate feedback mode for HARQ-ACK feedback excluding that for semi-persistent scheduling (SPS) PDSCH reception associated with different CORESETPoolIndex values, each CORESETPoolIndex value being associated with at least one physical uplink control channel (PUCCH) resource; and
 receive a plurality of HARQ-ACK feedback for SPS PDSCH reception associated with at least one CORESETPoolIndex value in a time interval using a separate feedback scheme or a joint feedback scheme, wherein:
  while using the separate feedback scheme, for each CORESETPoolIndex value, all HARQ-ACK feedback for SPS PDSCH reception associated with the CORESETPoolIndex value is received in a corresponding associated PUCCH resource; and
  while using the joint feedback scheme, all HARQ-ACK feedback for SPS PDSCH reception associated with all CORESETPoolIndex values is received in a PUCCH resource associated with a single CORESETPoolIndex value of the plurality of CORESETPoolIndex values.

15. The apparatus according to claim 14, wherein a HARQ-ACK feedback for a SPS PDSCH reception is associated with the CORESETPoolIndex value configured for a control resource set (CORESET) where an activated physical downlink control channel (PDCCH) of the SPS PDSCH reception is transmitted.

16. The apparatus according to claim 14, wherein while using the separate feedback scheme, for each CORESETPoolIndex value, when there is only HARQ-ACK feedback for SPS PDSCH reception associated with the CORESETPoolIndex value in the time interval, the associated PUCCH resource is determined from the at least one PUCCH resource associated with the CORESETPoolIndex value based on the payload size of bits of all HARQ-ACK feedback for SPS PDSCH reception associated with the CORESETPoolIndex value.

17. The apparatus according to claim 14, wherein while using the separate feedback scheme, for each CORESETPoolIndex value, when there is HARQ-ACK feedback excluding that for SPS PDSCH reception associated with the CORESETPoolIndex value in the time interval, the HARQ-ACK feedback for SPS PDSCH reception associated with the CORESETPoolIndex value is multiplexed with the HARQ-ACK feedback excluding that for SPS PDSCH reception associated with the CORESETPoolIndex value.

18. The apparatus according to claim 17, wherein the corresponding associated PUCCH resource is determined by last downlink control information (DCI) corresponding to the HARQ-ACK feedback excluding that for SPS PDSCH reception associated with the CORESETPoolIndex value and a total payload size of bits of all the HARQ-ACK feedback for SPS PDSCH reception associated with the CORESETPoolIndex value and the HARQ-ACK feedback excluding that for SPS PDSCH reception associated with the CORESETPoolIndex value in the time interval.

19. The apparatus according to claim 14, wherein while using the joint feedback scheme, the single CORESETPoolIndex value is predefined or configured by radio resource control (RRC) signalling.

20. An apparatus comprising:
a processor; and
a memory coupled to the processor, the processor configured to cause the apparatus to:
 receive configuration information on hybrid automatic repeat request-acknowledge (HARQ-ACK) feedback for physical downlink shared channel (PDSCH), wherein the configuration information at least indicates a plurality of CORESETPoolIndex values and a separate feedback mode for HARQ-ACK feedback excluding that for semi-persistent scheduling (SPS) PDSCH reception associated with different CORESETPoolIndex values, each CORE- SETPoolIndex value being associated with at least one physical uplink control channel (PUCCH) resource; and transmit a plurality of HARQ-ACK feedback for SPS PDSCH reception associated with at least one CORESETPoolIndex value in a time interval using a separate feedback scheme or a joint feedback scheme, wherein:

while using the separate feedback scheme, for each CORESETPoolIndex value, all HARQ-ACK feedback for SPS PDSCH reception associated with the CORESETPoolIndex value is transmitted in a corresponding associated PUCCH resource; and while using the joint feedback scheme, all HARQ-ACK feedback for SPS with all PDSCH reception associated CORESETPoolIndex values is transmitted in a PUCCH resource associated with a single CORESETPoolIndex value of the plurality of CORESETPoolIndex values.

* * * * *